(12) United States Patent
Kelly

(10) Patent No.: US 6,372,140 B2
(45) Date of Patent: Apr. 16, 2002

(54) DIFFUSED AERATION METHOD

(75) Inventor: Jeffrey T. Kelly, Carnegie, PA (US)

(73) Assignee: Red Valve Co., Inc., Carnegie, PA (US)

( * ) Notice: Subject to any disclaimer, the term of this patent is extended or adjusted under 35 U.S.C. 154(b) by 0 days.

(21) Appl. No.: 09/794,965

(22) Filed: Feb. 27, 2001

Related U.S. Application Data

(62) Division of application No. 09/419,040, filed on Oct. 15, 1999, now Pat. No. 6,193,220.
(60) Provisional application No. 60/104,362, filed on Oct. 15, 1998.

(51) Int. Cl.[7] ................................................. C02F 3/02
(52) U.S. Cl. .................. 210/629; 210/758; 210/220
(58) Field of Search ................ 210/629, 758, 210/220

(56) References Cited

U.S. PATENT DOCUMENTS

| | | | |
|---|---|---|---|
| 4,029,581 A | 6/1977 | Clough, Jr. et al. | 210/220 |
| 4,203,841 A | 5/1980 | Shimizu et al. | 210/205 |
| 4,607,663 A | 8/1986 | Raftis et al. | 137/846 |
| 4,720,360 A | 1/1988 | Melber | 261/76 |
| 4,960,546 A | 10/1990 | Tharp | 261/122 |
| 4,961,854 A | 10/1990 | Wittmann et al. | 210/621 |
| 5,133,876 A | 7/1992 | Tharp | 210/758 |
| 5,254,253 A | 10/1993 | Behmann | 210/607 |
| 5,674,433 A | 10/1997 | Semmens et al. | 261/37 |
| 5,676,823 A | 10/1997 | McKay et al. | 209/170 |
| 6,016,839 A | 1/2000 | Raftis et al. | 137/846 |

OTHER PUBLICATIONS

"Red Valve Company Case Studies," published at http://www.redvalve.com/brochure/airdiffuser.html#coarse, Sep. 15, 1998.

Primary Examiner—Chester T. Barry
(74) Attorney, Agent, or Firm—Webb Ziesenheim Logsdon Orkin & Hanson, P.C.

(57) ABSTRACT

A diffused aeration method carried out in an aeration tank which contains a plurality of coarse bubble jet diffusers and a plurality of fine bubble jet diffusers strategically located to provide aeration in an inductive downward flow stream induced by the coarse bubble jet diffusers. The method increases oxygen transfer efficiency and mixing with little or no increase in operating power costs.

7 Claims, 2 Drawing Sheets

DIFFUSED AERATION METHOD

RELATED APPLICATIONS

This application is a division of application Ser. No. 09/419,040 filed Oct. 15, 1999, now U.S. Pat. No. 6,193,220, which is based on priority Provisional Application Ser. No. 60/104,362, filed Oct. 15, 1998.

BACKGROUND OF THE INVENTION

1. Field of the Invention

The present invention relates to aeration systems and, more particularly, systems for aerating effluent in wastewater treatment plants, or the like.

2. Description of the Prior Art

In wastewater treatment plants, it is known to aerate effluent or sludge as part of the wastewater purification process commonly known as the "activated sludge" process. This process typically includes a biological treatment system consisting of a contained volume of wastewater with an aerobic microorganism colony which thrives on biodegradation of the wastewater in an aerobic environment. In order to maintain the requisite aerobic environment, supplemental air must be introduced into the system to promote the dissolution of gaseous oxygen into the liquid phase. The introduction of supplemental air is commonly achieved through the use of either mechanical surface aerators or submerged diffused aerators.

The rate of dissolution of gaseous oxygen into the liquid phase is directly proportional to (1) the surface area of the gas bubbles produced by these aerators, wherein the oxygen molecule travels across this "boundary" from the gaseous phase within the bubble to the liquid phase without the bubble; and (2) the residence time, i.e., the length of time the gas bubble is exposed to the liquid. For example, several hundred smaller gas bubbles contain more surface area than one large bubble containing the same total volume of air, and hence, the smaller bubbles provide more efficient oxygen transfer. Due to friction losses, however, the energy required to produce fine bubbles increases as the size of the diffuser orifices decreases. As a result, fine bubble diffusers which provide more efficient oxygen transfer, have high operating power costs, while larger bubble jet diffusers, i.e., "coarse bubble jet diffusers", which produce a larger bubble size with less oxygen transfer efficiency, have a lower operating power cost.

The coarse bubble diffuser offers the advantage of higher exit velocity which provides greater mixing activity within the aeration tank, resulting in increased residence time of the air in solution. This, in turn, provides an increase in the total oxygen transferred while increasing the oxygen transfer efficiency closer to that of a fine bubble system. Complete mixing of the microorganism colony within the aeration tank system is critical to ensure adequate waste treatment within the aeration tank. Inadequate mixing can result in portions of the microorganism colony to settle to the tank bottom thereby limiting exposure of the microorganisms to the wastewater.

It is an object of the present invention to provide a diffused aeration system with improved overall oxygen transfer efficiency with little or no concomitant increase in operating power cost.

It is a further object of the present invention to provide a diffused aeration system having improved oxygen transfer efficiency while providing improved mixing capacity.

SUMMARY OF THE INVENTION

The above objects of the invention are satisfied with an improved aeration system which, in accordance with the present invention, is comprised of a plurality of coarse bubble jet diffusers connected with an air supply and a plurality of fine bubble jet diffusers connected with an air supply and disposed between the coarse bubble jet diffusers. Exemplary of suitable coarse bubble jet diffusers are the duckbill check valves described in U.S. Pat. No. 4,607,663, incorporated herein by reference. Preferred are the rubber duckbill check valves commercially available as TIDE-FLEX® valves from Red Valve Company, Inc. of Carnegie, Pa. Exemplary of suitable fine bubble jet diffusers are those commercially available as DOMEFLEX™ diffusers, also from Red Valve Company, Inc.

Each of the coarse bubble jet diffusers is connected with the air supply by at least one, preferably two, outer conduits. Likewise, each of the fine bubble jet diffusers is connected with the air supply by at least one inner conduit. In a preferred embodiment, the improved aeration system of the present invention comprises an aeration tank which contains a plurality of peripheral coarse bubble jet diffusers with a plurality of fine bubble jet diffusers located therebetween. The coarse bubble jet diffusers are connected with parallel, outer air distribution header pipes, and the fine bubble jet diffusers are connected with parallel inner air distribution header pipes. The inner air distribution header pipes are parallel to each other and to the outer header pipes. All header pipes are connected with an external air supply.

The coarse bubble jet diffusers are oriented to produce a high velocity air flow upward along opposing tank walls and across the tank surface such that the current from outer headers converges in the middle and is drawn back toward tank bottom due to the inductive downward flow streams created by the coarse bubble jet diffusers. The fine bubble jet diffusers are strategically located within the path of the inductive downward flow streams such that fine bubbles emitted by these diffusers travel in a flow path which is counter-current to the inductive downward stream created by the forced perimeter flow of the coarse bubbles. In operation, the diffused aeration system of the invention maximizes oxygen transfer efficiency, and maximizes mixing with little or no increase in operating power costs.

DETAILED DESCRIPTION OF THE INVENTION

Figure 1:
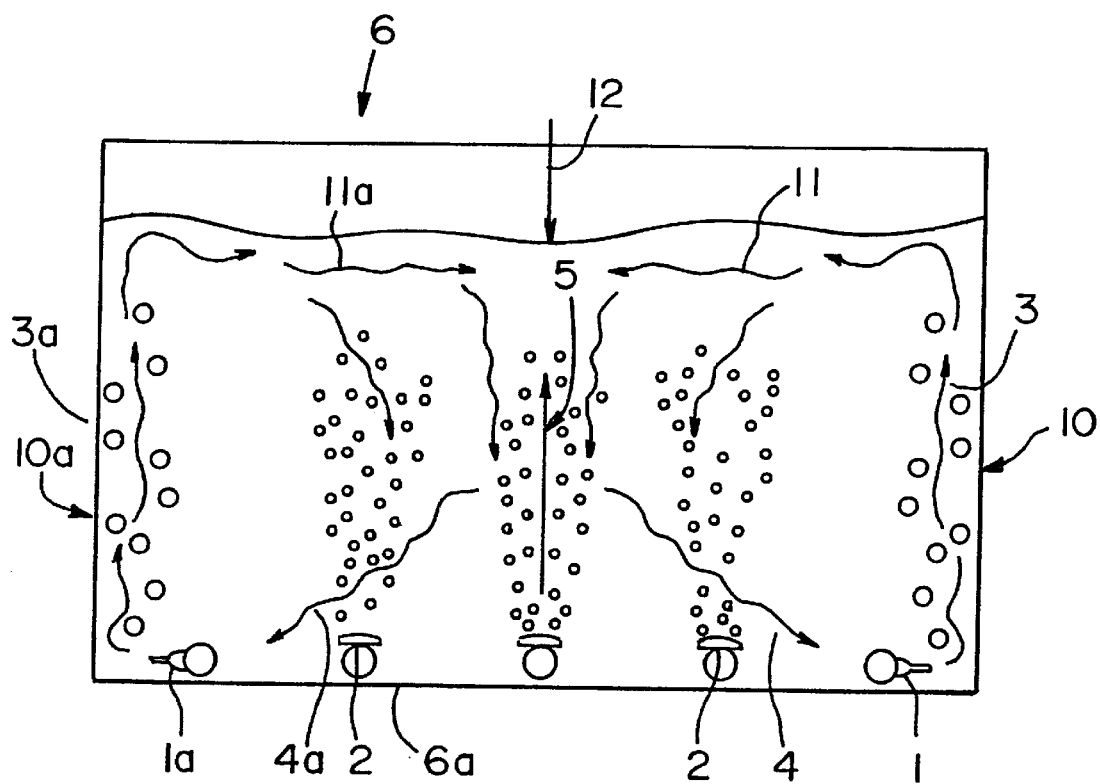
FIG. 1 is a section view of an aeration tank illustrating the flow patterns resulting from strategic placement of the coarse bubble jet diffusers and the fine bubble jet diffusers in accordance with the present invention.
Figure 2:
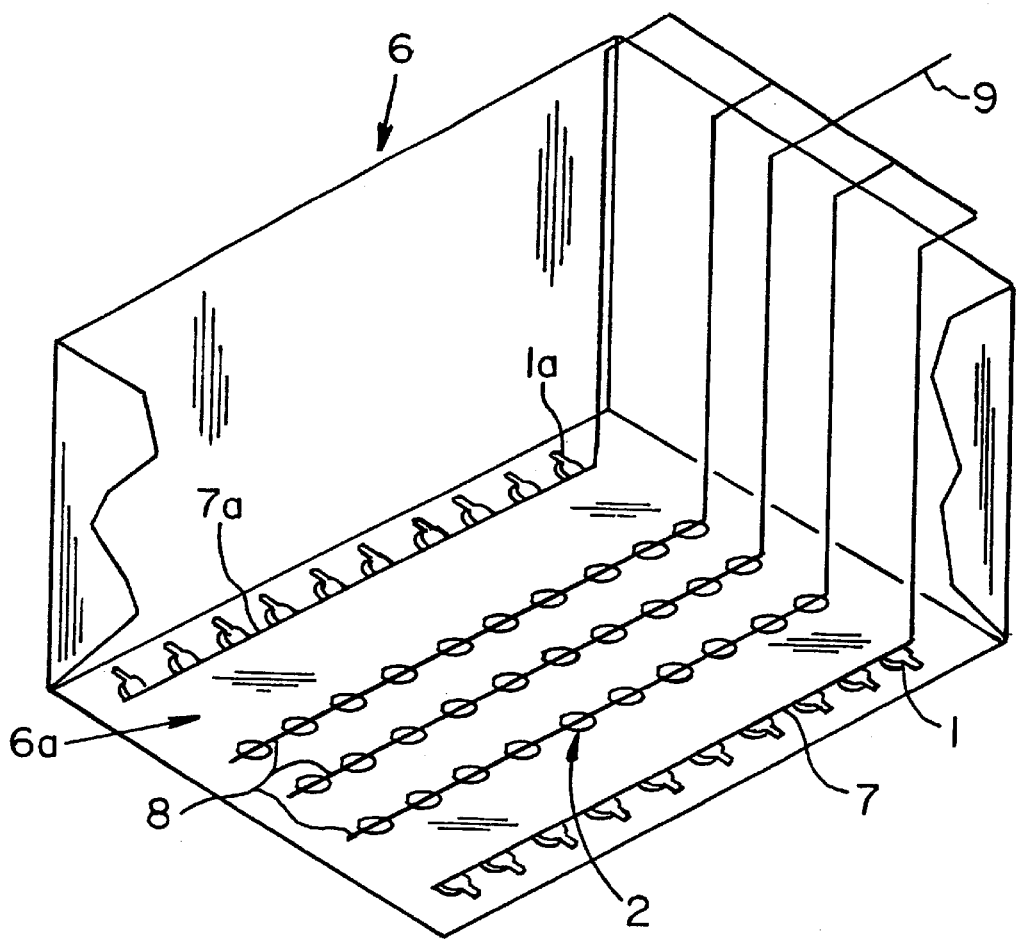
FIG. 2. is an isometric view of an aeration tank illustrating the placement of the coarse bubble diffuser headers and the fine bubble diffuser headers in accordance with the present invention.

FIGS. 1 and 2 show an aeration tank 6 having a bottom 6a and opposing walls 10 and 10a which contain the improved diffused aeration system of the invention. The diffused aeration system generally includes a plurality of outer or peripheral coarse bubble jet diffusers 1 and 1a and a plurality of fine bubble jet diffusers 2. The plurality of coarse bubble jet diffusers 1 and 1a are oriented linearly adjacent to opposing tank walls 10 and 10a, respectively, adjacent the tank bottom 6a. Outer air distribution header pipes 7 and 7a, which are connected with each of the plurality of peripheral coarse bubble jet diffusers 1 and 1a, respectively, are disposed adjacent the tank bottom 6a, parallel to opposing tank walls 10 and 10a, respectively.

Each of the outer header pipes 7 and 7a contain therein a plurality of discharge ports (not shown). The header pipes 7 and 7a are connected with an external air supply 9. The plurality of coarse bubble jet diffusers 1 and 1a are oriented to produce high velocity current flow 3 and 3a upward along opposing tank walls 10 and 10a, and across the surface of the tank 11 and 11a. The currents of opposing headers 7 and 7a intersect at the point of convergence 12 and are drawn back to the tank bottom 6a via the inductive flow paths 4 and 4a created by the coarse bubble jet diffusers 1 and 1a. Preferably, coarse bubble jet diffusers 1 and 1a are directed outwardly toward the tank walls 10 and 10a as shown in FIG. 1.

A plurality of inner air distribution header pipes 8, each having therein numerous discharge ports (not shown), are located near the center of the tank bottom 6a, parallel to the outer header pipes 7 and 7a and disposed therebetween. Each of the inner air distribution header pipes 8 is connected with the fine bubble jet diffusers 2 and with the external air supply 9. The fine bubble jet diffusers 2 are located within the inductive flow paths 4 and 4a such that the fine bubbles emitted therefrom travel in a counter-current air flow 5 which opposes the above-described inductive downward flow streams 4 and 4a.

Based on the foregoing, it can be seen that the flow pattern produced by the improved diffused aeration system of the present invention maximizes oxygen transfer by increasing residence time beyond the capabilities of a fine bubble system while maintaining a power consumption comparable to a coarse bubble-only aeration system. Further it can be seen that the present invention provides improved mixing. The unique attributes of this system result from the use of fine bubble jet diffusers strategically located to produce a counter-current air flow path in a downward flow stream induced by a system of parallel, generally oppositely directed coarse bubble jet diffusers.

It should be understood that the present invention is not limited to activated sludge applications, but is useful in any application where it is desirable to inject and diffuse one process fluid (i.e., liquid, gas solid particulate, etc.) into another process fluid for the purpose of aeration, diffusion, agitation or mixing.

The invention has been described with reference to the preferred embodiment, which is merely illustrative of the present invention, and not restrictive thereof. Obvious modifications and/or alterations of the invention may be made without departing from the spirit and scope thereof.

What is claimed is:

1. A method for aerating wastewater comprising the steps of:
    (a) introducing wastewater into an aeration tank having tank walls and a tank bottom;
    (b) introducing air from an external air supply through an array of coarse bubble jet diffusers into the wastewater; said coarse bubble jet diffusers oriented such that coarse bubbles emitted therefrom are directed upward along said tank walls and across a wastewater surface, converging thereon to create a downward inductive airflow stream; and
    (c) simultaneously introducing air from an external air supply through an array of fine bubble jet diffusers into said wastewater,
    each of said fine bubble jet diffusers oriented such that fine bubbles emitted therefrom are directed upward to create a counter-current air flow stream which opposes the downward inductive air flow stream.

2. A method for aerating wastewater, comprising the steps of:
    (a) introducing wastewater into an aeration tank having tank walls and a tank bottom;
    (b) introducing air from an external air supply through an array of coarse bubble jet diffusers into the wastewater;
    said coarse bubble jet diffusers oriented such that coarse bubbles emitted therefrom are directed upward and an inductive downward flow stream is produced in a region of the tank in which coarse bubbles are not directed upward;
    (c) simultaneously introducing air from an external air supply through an array of fine bubble jet diffusers into said wastewater,
    each of said fine bubble jet diffusers oriented such that fine bubbles emitted therefrom are directed upward to create a counter-current air flow stream which opposes the inductive downward flow stream.

3. The method of claim 2, wherein said array of coarse bubble jet diffusers is disposed on the periphery of said tank walls adjacent said tank bottom.

4. The method of claim 2, wherein said array of fine bubble jet diffusers is disposed adjacent said tank bottom.

5. The method of claim 2, wherein said aeration tank has two pairs of opposing tank walls, said coarse bubble jet diffusers are disposed linearly along each of one pair of opposing tank walls and said fine bubble jet diffusers are disposed between and parallel to said coarse bubble jet diffusers.

6. The method of claim 2, wherein each of said coarse bubble jet diffusers is connected with one of at least two outer air distribution header pipes, said outer header pipes disposed adjacent said tank bottom, adjacent and parallel to each of said one pair of opposing tank walls, said outer air distribution header pipe being connected with an external air supply.

7. The method of claim 2, wherein said aeration tank contains wastewater effluent comprising an aerobic microorganism colony.

* * * * *